(12) United States Patent
Davies et al.

(10) Patent No.: US 10,316,191 B2
(45) Date of Patent: Jun. 11, 2019

(54) CONTAINER FOR THERMOPLASTIC PELLETS

(71) Applicant: Potters Industries, LLC, Wilmington, DE (US)

(72) Inventors: Chris Davies, Plymouth Meeting, PA (US); Mark Terry, Madison, MS (US)

(73) Assignee: Potters Industries, LLC, Wilmington, DE (US)

( * ) Notice: Subject to any disclaimer, the term of this patent is extended or adjusted under 35 U.S.C. 154(b) by 0 days.

(21) Appl. No.: 15/429,467

(22) Filed: Feb. 10, 2017

(65) Prior Publication Data

US 2018/0230308 A1      Aug. 16, 2018

(51) Int. Cl.
| | |
|---|---|
| *C08L 93/04* | (2006.01) |
| *C09D 193/04* | (2006.01) |
| *C09J 193/04* | (2006.01) |
| *B65D 33/00* | (2006.01) |
| *B65D 65/46* | (2006.01) |

(52) U.S. Cl.
CPC .............. *C08L 93/04* (2013.01); *B65D 33/00* (2013.01); *B65D 65/46* (2013.01); *C09D 193/04* (2013.01); *C09J 193/04* (2013.01)

(58) Field of Classification Search
CPC ...... C08L 93/04; C09D 193/04; C09J 193/04; B65D 65/38; B05D 1/265
USPC ........................................................ 524/425
See application file for complete search history.

(56) References Cited

U.S. PATENT DOCUMENTS

| | | | | |
|---|---|---|---|---|
| 3,480,189 | A | * | 11/1969 | Trumbull ................. B02C 4/08 225/104 |
| 3,513,012 | A | | 5/1970 | Point |
| 3,771,254 | A | | 11/1973 | Scott et al. |
| 4,101,292 | A | | 7/1978 | Hogan, II |
| 4,193,909 | A | * | 3/1980 | Lundberg ............... A01G 9/021 264/122 |
| 4,268,542 | A | | 5/1981 | Sakakibara et al. |
| 4,480,064 | A | * | 10/1984 | Chopra ..................... C08K 3/22 523/351 |
| 4,672,684 | A | | 6/1987 | Barnes et al. |
| 6,280,667 | B1 | | 8/2001 | Koenig et al. |
| 6,376,589 | B1 | | 4/2002 | Tanaka et al. |

(Continued)

FOREIGN PATENT DOCUMENTS

CN        103819865 B  *  4/2016  ............... B29B 7/72

OTHER PUBLICATIONS

International Search Report and Written Opinion for PCT/US2018/13849 filed Jan. 16, 2018 dated of Jul. 6, 2018.

*Primary Examiner* — Michael Bernshteyn
(74) *Attorney, Agent, or Firm* — Buchanan Ingersoll & Rooney PC

(57) ABSTRACT

Disclosed are apparatuses and methods including incorporation of additives into a bulk materials container by coating, impregnating, or otherwise applying the additives to at least a portion of the container and/or the material comprising the container. The container may be intended for containing bulk material used in a batch or continuous process, where the container can be consumed by the process along with the bulk material. The additives incorporated into the container can be substances that may be used by the process. The additives can modify the process. The additives can modify and/or condition the product being formed by the process.

8 Claims, 2 Drawing Sheets

(56) References Cited

U.S. PATENT DOCUMENTS

| | | |
|---|---|---|
| 2011/0164834 A1 | 7/2011 | Stiglic et al. |
| 2011/0245057 A1* | 10/2011 | Scoledes ............... B65F 1/0006 493/227 |
| 2012/0102627 A1 | 5/2012 | Feraco |
| 2013/0044966 A1 | 2/2013 | Binger et al. |
| 2015/0036952 A1 | 2/2015 | Pang |

* cited by examiner

CONTAINER FOR THERMOPLASTIC PELLETS

FIELD OF THE INVENTION

The present invention relates to apparatuses and methods that can include incorporation of additives into or onto a container, the container configured to contain bulk material for a process, where the additives may be used by the process to modify and/or condition the product of the batch process.

BACKGROUND OF THE INVENTION

Conventional material processing techniques for finished goods (e.g., paint) that include use of bulk materials (e.g., thermoplastic pellets) can be limited. For example, thermoplastic pellets may be manufactured using a variety of ingredients that may be fed into an extruder. Some of these ingredients can include pigments to impart color to the thermoplastic pellets. These thermoplastic pellets may then be placed into bags for containment and transport. The bags containing the thermoplastic pellets may then be used as part of a batch process. This may include introducing them into a heating kettle to generate paint.

Conventional processing techniques may restrict the color of the finished product. For example, the color of the finished product may be limited to the pigment color that was fed into the extruder. Thus, the addition of pigment during the thermoplastic pellet manufacturing process may have to be modified each time a different finished product color is required. This can be a significant burden. For example, the finished product may be destined for use by different consumers or different applications that require different color indexes. Adjusting for the differences in the required color index for the finished product by changing the color of pigment added during the thermoplastic manufacturing process can reduce efficiency and/or quality of the processes used to make the thermoplastic pellets and/or the finished product. This may be especially so during mass production of the thermoplastic pellets.

It may be beneficial to accommodate the required color index differences via modifications to the bag containing the thermoplastic pellets. Examples of conventional bulk bags and containers for materials handling may be understood from U.S. Pat. Nos. 3,771,254, 4,101,292, U.S. Pat. Publ. No. 2011/0164834, U.S. Pat. Publ. No. 2011/0245057, U.S. Pat. Publ. No. 2012/0102627, U.S. Pat. Publ. No. 2013/0044966, and U.S. Pat. Publ. No. 2015/0036952.

SUMMARY OF THE INVENTION

Embodiments of the present invention may relate to apparatuses and methods including incorporation of additives into a bulk materials container. This may include coating, impregnating, or otherwise applying at least one additive to at least a portion of the container and/or the material comprising the container. The container may be configured for containing bulk material used in a batch or continuous process. The container may be intended to be sacrificial. For example, the container can be consumed by the process along with the bulk material. The additive included with the container can be substances that may be used by the process. For example, the container can be a bag configured to contain thermoplastic pellets intended for use in a painting process to produce paint. The additive can be a color pigment that can be used to modify the color of paint. The thermoplastic pellets can be produced at one specification. The thermoplastic pellets can then be placed into a bag without the color pigment to be consumed in a first painting process and to generate paint having a first color index, as dictated by the specifications used to product the thermoplastic pellets. The thermoplastic pellets can also be placed into a bag including the color pigment to be consumed in a second painting process to generate paint having a second color index, as influenced by the color pigment included with the bag.

By including the color pigment with the bag, the thermoplastic pellets can be produced (e.g., mass produced) at one specification while the paint can be made to exhibit a first color index or a second color index without having to change the pigment used during the thermoplastic pellet formation process. The second color index may be the same as or different from the first color index.

In some embodiments, a container for thermoplastic pellets can include a bag configured to contain the thermoplastic pellets. Each of the bag and the thermoplastic pellets may be configured to be consumed by a process. The bag may include at least one color pigment. In some embodiments, the process can be used to produce a final product. In some embodiments, the at least one color pigment can be configured to influence a color index of the final product. In some embodiments, the at least one pigment may be configured to at least one of modify the process, modify the final product, and condition the final product. In some embodiments, the bag can further include at least one additive in addition to the at least one color pigment.

In some embodiments, a method of producing a container for thermoplastic pellets can include generating a bag configured to contain thermoplastic pellets. The method may include generating the bag so as to include at least one color pigment with the bag. This may be achieved by at least one of coating, impregnating, and applying the color pigment to the bag. The bag may be configured for use in a process to produce a final product. In some embodiments, the bag and the thermoplastic pellets both can be configured to be consumed by the process. The method may further include configuring the at least one color pigment to influence a color index of the final product. In some embodiments, the configuring the at least one color pigment can further include causing the at least one color pigment to at least one of modify the process, modify the final product, and condition the final product. In some embodiments, the generating the bag can further incorporating at least one additive to the bag in addition to the at least one color pigment.

In one embodiment, a method can include generating a bulk material including a first additive via a bulk material process. The first additive may be configured to be used in a first process. The first process may be used to generate a first final product. The first product may have a first specification. The first additive may also be configured to be used in a second process. The second process may be used to generate a second final product. The second final product may have a second specification. The method may further include generating a first container configured to contain the bulk material and configured to be consumed by the first process. The method may further include generating a second container including a second additive. The second container may be configured to contain the bulk material and configured to be consumed by the second process. The method may further include introducing the bulk material into the first container and the second container. The method may further include introducing the first container with the bulk material into the first process. This may be done to generate the first final product. The method may further include introducing the second container with the bulk material into the second process. This may be done to generate the second final product.

In some embodiments, the bulk material can be thermoplastic pellets. In some embodiments, at least one of the first container and the second container can be a bag. In some embodiments, at least one of the first final product and the second final product can be at least one of paint, a coating, and an adhesive. In some embodiments, at least one of the first additive and the second additive can be a pigment. In some embodiments, at least one of the first additive and the second additive can be configured to influence a color index of at least one of the first final product and the second final product. In some embodiments, the first additive can be configured to generate the first final product having a first color index. The second additive can be configured to generate the second final product having a second color index. In some embodiments, the first color index can be different from the second color index.

The method may further include a third process to generate a third final product having a third specification. The first additive may also be configured to be used in the third process to generate the third final product having the third specification. In some embodiments, the method may further include a third container. The third container may include a third additive. The third container may be configured to contain the bulk material and configured to be consumed by the third process. The method may further include introducing the bulk material into the third container. The method may further include introducing the third container with the bulk material into the third process. This may be done to generate the third final product. In some embodiments, at least one of the first additive, the second additive, and the third additive can be a pigment.

In some embodiments, at least one of the first additive, the second additive, and the third additive can be configured to influence a color index of at least one of the first final product, the second final product, and the third final product. In some embodiments, the first additive can be configured to generate the first final product having a first color index. The second additive can be configured to generate the second final product having a second color index. The third additive can be configured to generate the third final product having a third color index. In some embodiment, the first color index, the second color index, and the third color index can be different from each other.

Further features, aspects, objects, advantages, and possible applications of the present invention will become apparent from a study of the exemplary embodiments and examples described below, in combination with the Figures, and the appended claims.

BRIEF DESCRIPTION OF THE DRAWINGS

The above and other objects, aspects, features, advantages and possible applications of the present innovation will be more apparent from the following more particular description thereof, presented in conjunction with the following drawings. Like reference numbers used in the drawings may identify like components.

DETAILED DESCRIPTION OF THE INVENTION

The following description is of exemplary embodiments that are presently contemplated for carrying out the present invention. This description is not to be taken in a limiting sense, but is made merely for the purpose of describing the general principles and features of the present invention. The scope of the present invention is not limited by this description.

Figure 1:
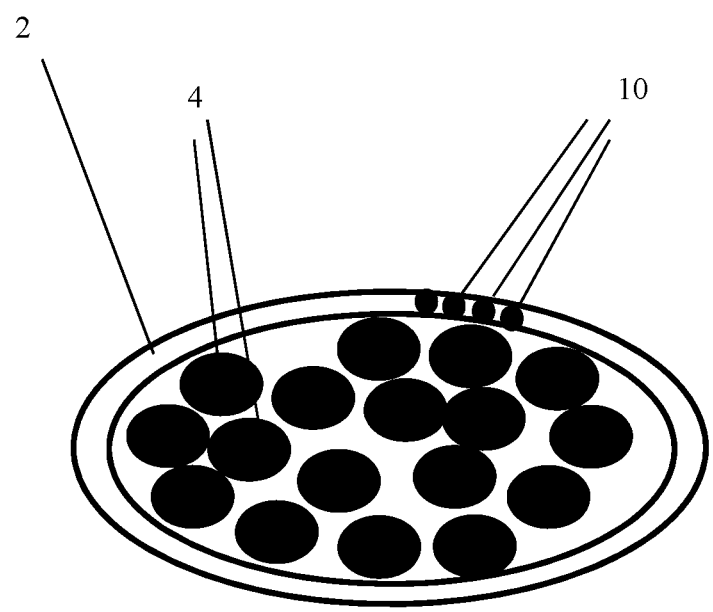
FIG. 1 is a cross sectional view of an embodiment of a container that may be used.
Figure 2:
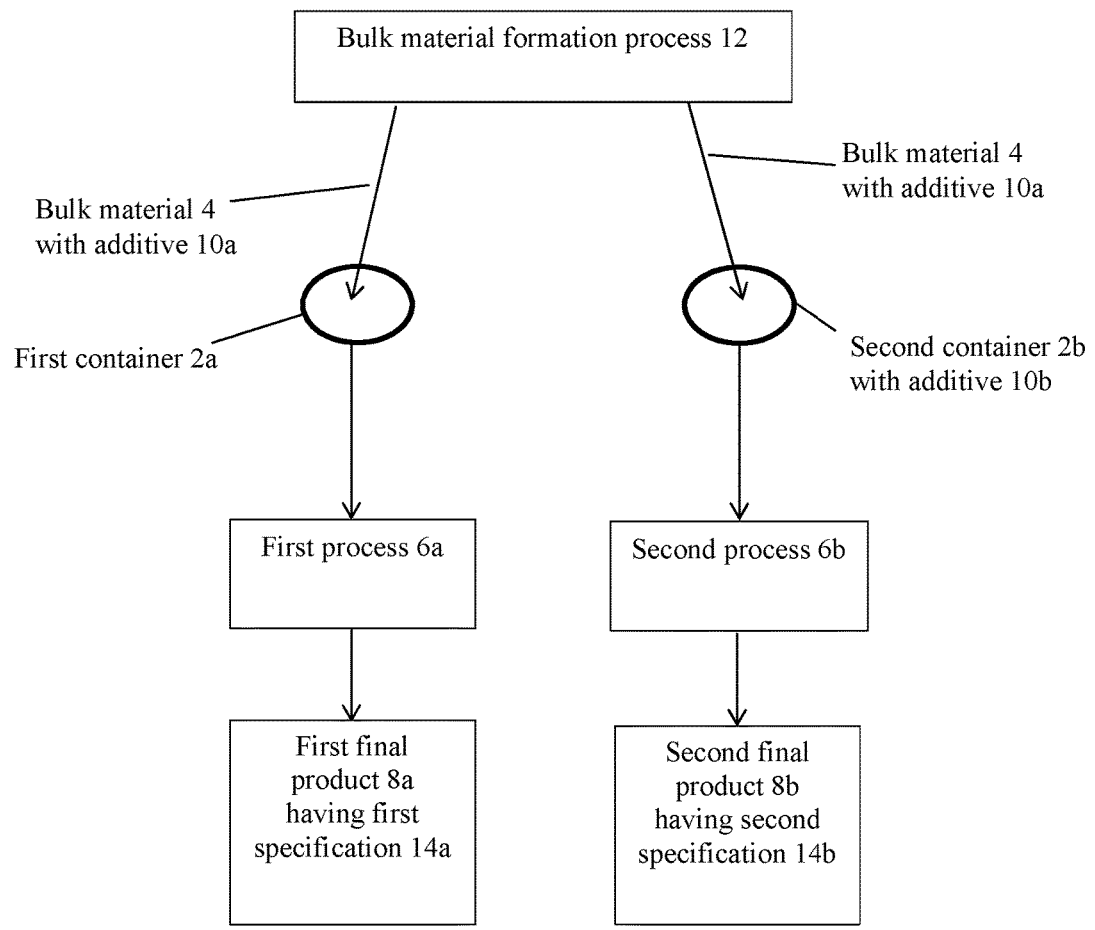
FIG. 2 is an exemplary block diagram of a process that may be used with an embodiment of the container in FIG. 1.

Referring to FIGS. 1-2, embodiments can include a container 2. The container 2 can include a bag, a box, a sack, a bladder, etc. The container 2 may be configured to contain bulk material 4. The bulk material 4 can be material intended to be used as part of a process 6. The process 6 can be a chemical process. The process 6 can be a batch type process, a continuous type process, or both. The process 6 can be used to produce a final product 8. The bulk material 4 can be configured to be used as input to the process 6. The input can be a fuel source, a chemical source, etc. For example, the bulk material 4 can be used to modify the process 6. In some embodiments, the bulk material 4 can be used to make, modify, and/or condition the final product 8. For example, the bulk material 4 can be plastic pellets (e.g., thermoplastic pellets) used for making, modifying, and/or conditioning paint (e.g., the final product 8) in a paint process 6. Other examples can include carbon 4 used for making, modifying, and/or conditioning steel 8 in steelmaking process 6, agglomerate 4 used for making, modifying, and/or conditioning sinter 8 in a sintering process 6, etc.

In some embodiments, at least a portion of the container 2 can be configured to be sacrificial. For example, the container 2 containing the bulk material 4 can be configured to be consumed by the process 6. In some embodiments, the container 2 can be configured to be consumed by the process 6 without having an effect on the process 6. In some embodiments, the container 2 can be configured to be consumed by the process 6 by having an effect on the process 6. This can include using the container 2 as an input to the process 6. The input can be a fuel source, a chemical source, etc. For example, the container 2 can be used to modify the process 6. In some embodiments, the container 2 can be used to modify and/or condition the final product 8.

In some embodiments, the container 2 can include at least one additive 10. This can include coating, impregnating, and/or otherwise applying the additive 10 to at least a portion of the container 2. Some embodiments can include generating a film on at least a portion of the container 2, the film including the additive 10. In addition, the additive 10 can be applied to the bulk material 4 within the container 2. The additive 10 can be configured to be used as input to the process 6. The input can be a fuel source, a chemical source, etc. For example, the additive 10 can be used to modify the process 6. In some embodiments, the additive 10 can be used to modify and/or condition the final product 8.

The additive 10 can be a pigment. However, other additives can be used, such as an element (e.g., powdered titanium, powdered carbon, iron pellets), a mineral (e.g., bauxite, halite, basalt), etc. The pigment 10 may include a fluorescent material, a phosphorescent material, other luminescent material, etc. The pigment 10 may be configured to modify the color, translucence, and/or reflectance of the final product 8.

The modification and/or conditioning caused by the bulk material 4 can be the same as or different from the modification and/or conditioning caused by the container 2 and/or the additive 10. The modification and/or conditioning caused by the container 2 can be the same as or different from the modification and/or conditioning caused by the bulk material 4 and/or the additive 10. The modification and/or conditioning caused by the additive 10 can be the same as or different from the modification and/or conditioning caused by the bulk material 4 and/or the container 2.

In some embodiments, the container 2 can include a bag 2. The bag 2 may be fabricated from paper, hemp, canvas, nylon, etc. The bag 2 can be configured to contain thermoplastic pellets 4. The thermoplastic pellets 4 may be intended for use in a painting process 6 to produce paint 8 or some other type of coating or adhesive. The painting process 6 may be a batch process, where bags 2 of thermoplastic pellets 4 can be introduced into the process 6 to provide a desired modification and/or conditioning to the paint 8. An additive 10 can be included with at least a portion of the bag 2. The additive 10 can be a color pigment 10. During the painting process 6, the bag 2, along with the thermoplastic pellets 4, may be consumed by the painting process 6. The consumption of the color pigment 10 in the process 6 can modify the color of the paint 8. The thermoplastic pellets 4 can be placed into a bag 2 without a color pigment 10 to be introduced into a painting process 6 to generate paint 8 having a first color. The thermoplastic pellets 4 can be placed into a bag 2 with a color pigment 10 to be introduced into the painting process 6 to generate paint 8 having a second color. The thermoplastic pellets 4 can be placed into a bag 2 with a different color pigment 10 to be introduced into a painting process 6 to generate paint 8 having a third color. Each of the painting processes 6 can be the same or different from each other. Each of the painting processes 6 can use the same thermoplastic pellets 4. Each of the painting processes 6 can generate paint 8 having different colors without having to modify the color pigment of the thermoplastic pellets 6 during production of the thermoplastic pellets 6.

Referring to FIG. 2, at least one implementation can include a bulk material formation process 12. This can include forming a bulk material 4. For example, thermoplastic pellets 4 may be formed by introducing at least one ingredient into an extruder 12. The bulk material 4 can be configured for use in a process 6 to form a final product 8. For example, the thermoplastic pellets 4 can be configured for use in a painting process 6 to form paint 8. At least one ingredient of the bulk formation process 12 can include a first additive 10a. The first additive 10a can be a first color pigment 10a, for example. The first additive 10a can be configured to generate a final product 8 having a first specification 14a. The first specification 14a can be a first color index 14a. For example, the first color pigment 10a can be configured to generate paint 8 having a first color index 14a. The first additive 10a may be suitable for a first process 6a and a second process 6b. For example, the first color pigment 10a may be suitable for a first painting process 6a and second painting process 6b. The first additive 10a may also be suitable for use in additional processes 6 (e.g., a third process, a fourth process, etc.). Any of the processes 6 can be the same or different from any other process 6.

A first container 2a can be generated. This may include generating a first bag 2a. The first container 2a may be configured to contain the bulk material 4. For example, the thermoplastic pellets 4 can be transported from the extruder to the first bag 2a. The first container 2a can be further configured to be an input to the first process 6a. The first container 2a, along with the bulk material 4 contained therein, may be transported to the first process 6a. The first container 2a, along with the bulk material 4 contained therein, may be introduced into the first process 6a to be consumed by the first process 6a. For example, the first bag 2a, along with the thermoplastic pellets 4 contained therein, may be introduced a heating kettle of the first painting process 6a. The consumption of the first additive 10a can modify the first process 6a and/or condition the final product 8 to cause the final product 8 to exhibit the first specification 14a. For example, the consumption of the first color pigment 10a can modify the first painting process 6a and/or condition the paint 8 to cause the paint 8 to exhibit the first color index 14a.

A second container 2b (e.g., a second bag 2a) can be generated. The second container 2b can be configured to contain the bulk material 4. For example, the thermoplastic pellets 4 can be transported from the extruder to the second bag 2b. The second container 2b can be further configured to be an input to the second process 6b. The second container 2b may include a second additive 10b. The second additive 10a can be a second color pigment 10b. For example, the second color pigment 10b may be applied to the second bag 2b. The second additive 10b may be configured to be an input to the second process 6b. The second container 2b, along with the bulk material 4 contained therein, may be transported to the second process 6b. The second container 2b, along with the bulk material 4 contained therein, may be introduced into the second process 6b to be consumed by the second process 6b. For example, the second bag 2b, along with the thermoplastic pellets 4 contained therein, may be introduced a heating kettle of the second painting process 6b. The consumption of the second additive 10b can modify the second process 6b and/or condition the final product 8 to cause the final product 8 to exhibit the second specification 14b. For example, the consumption of the second color pigment 10b can modify the second painting process 6b and/or condition the paint 8 to cause the paint 8 to exhibit the second color index 14b.

As noted above, there may be a third process 6, a fourth process 6, etc., each process 6 configured to generate a final product 8 having a third specification 14, fourth specification 14, etc., respectively. A bag 2 with an additive 10 may be generated for each process 6. The consumption of the bag 2 with the additive 10 can modify the process 6 and/or condition the final product 8 to cause the final product 8 to exhibit a third specification 14, fourth specification 14, etc.

The first specification 14a may be a first color index 14a. The second specification 14b may be a second color index 14b. The first color index 14a can be a white color having some yellowness. The second color index 14b can be a white color with less yellowness than that of the first color index 14a. Reducing the yellowness index can allow the paint 8 to appear whiter. Thus, the method can use the same thermoplastic pellets 4 in the first painting process 6a and in the second painting process 6b to produce a first paint 8a from the first painting process 6a and a second paint 8b from the second painting process 6b. The second paint 8b may have a reduced yellowness index as compared to the first paint 8a.

In some implementations, the bulk material formation process 12 can be configured to make only white thermoplastic pellets 4. For example, the first color pigment 10a may be a white pigment with some yellowness. This may be done to generate a first paint 8a via the first painting process 6a having a first color index 14a corresponding to the white with some yellowness color. The second bag 2a can include a second color pigment 10b of blue, for example. The second painting process 6b, consuming the second bag 2a and the thermoplastic pellets 4, can be used to generate a second paint 8b having a second color index 14b. The second color index 14b can correspond to a white color with reduced yellowness. Thus, the bag 2 can act as a delivery mechanism for the color pigment 10.

Examples of the reduction of yellowness index can be demonstrated by the Tables I and II below. Table I shows results of a first test (Test #1) and Table II shows results of a second test (Test #2). Each of Table I and II tested a ThermoDrop White TX Spray™ (JSW005) formulation used as the first pigment 10a for thermoplastic pellets 4. The test parameters for each test were set to assess property evaluations (e.g., color index) of the final product 8 with film change (e.g., change pigment 10 included with a bag 2). Test #1 and Test #2 were conducted by independent laboratory technicians. For each test, Ultramarine blue pigment was used as the pigment 10 applied to the bag 2. The Ultramarine blue pigment 10 was added at a fixed percentage for each bag 2. The application of the Ultramarine blue pigment 10 resulted in a blue bag film. White thermoplastic pellets 4 were contained in each bag 2. Three sets of bags 2 were made: 1) a set of clear bags ("Clear Film"); 2) a set of a mixture of blue film and clear film bags ("0.94 g Blue Film @2% Blue+0.31 g Clear Film"); and 3) a set of 100% blue film bags ("1.25 g Blue Film @2% Blue"). The film addition rate or 1.25 grams total can correspond to a projected film usage for a final product 8 packaged in a 4.5 mil batch inclusive bag 2. The results show that as the ratio of blue film increases, the final product 8 gets whiter (e.g., the yellowness index decreases)—see the YD 1925 Yellowness Index line in the Tables. Other properties of the final product 8 were unaffected by the film change. The results demonstrate that the bag 2 can be used as a color modification delivery system for the final product 8.

It is contemplated that an orange film can have a similar effect for yellow formulated thermoplastic pellets 4 that may be packaged in a bag 2 including an orange film. It is further contemplated that other color pigments 10 can be used to make modifications to other color indexes 14.

TABLE I

Test # 1 for Tinted Film Effect on Product Color (Ultramarine Blue in 4.5 mil Low Melt Batch Inclusive Bag.

| Test # 1 | Clear Film | 0.94 g Blue Film @2% Blue + 0.31 g Clear Film | 1.25 g Blue Film @2% Blue |
|---|---|---|---|
| Typical Formulation | | % | |
| Maleic Modified Glycerol Ester of Rosin | 15.30 | 15.30 | 15.30 |
| Plasticizer | 1.50 | 1.50 | 1.50 |
| Cold Flow and Viscosity Modifier | 2.50 | 2.50 | 2.50 |
| Flow Modifier (Elastomeric Polymer) | 1.00 | 1.00 | 1.00 |
| Bag Film | 0.25 | 0.25 | 0.25 |
| $TiO_2$ (Rutile Grade 96% Pure) | 10.50 | 10.50 | 10.50 |
| Glass Beads (Type 1 70% Round) | 35.00 | 35.00 | 35.00 |
| Pellet Coating (Surface Treated) | 1.00 | 1.00 | 1.00 |
| $CaCO_3$ Filler (STD 325 Mesh) | 33.03 | 33.03 | 33.03 |
| Binder (%) | 20.55 | 20.55 | 20.55 |
| Total (%) | 100.08 | 100.08 | 100.08 |
| Initial (400 F.) Viscosity | | Initial (400 F.) Viscosity w/SC4-27 Spindle | |
| 6 RPM | 7750 | 8958 | 8042 |
| 12 RPM | 5125 | 5854 | 5438 |
| 13 RPM | 3525 | 3667 | 3633 |
| 60 RPM | 2708 | 2833 | 2833 |
| Color Measurement | | Color Measurement w/Byk Gardner 45/0 | |
| Brightness - L* (C/2°) | 94.05 | 93.76 | 93.17 |
| Red/Green Color Scale - a* (C/2°) | −0.69 | −1.71 | −1.90 |
| Blue/Yellow Color Scale - b* (C/2°) | 3.68 | 2.70 | 2.09 |
| Brightness Y (C/2°) | 85.38 | 84.71 | 83.34 |
| Color Coordinate - x (C/2°) | 0.3159 | 0.3127 | 0.3113 |
| Color Coordinate - y (C/2°) | 0.3235 | 0.3223 | 0.3213 |
| YD 1925 Yellowness Index (C/2°) | 6.82 | 4.15 | 2.83 |
| Shore A Hardness (115 F.) | 52 | 48 | 54 |
| Ring and Ball Softening Point (F.) | 221 | 222 | 222 |
| Weight in Air | 1.963 | 4.651 | 3.71 |
| Weight in Water | 0.968 | 2.289 | 1.82 |
| Specific Gravity | 2.028 | 2.032 | 2.037 |

TABLE II

Test # 2 for Tinted Film Effect on Product Color (Ultramarine Blue in 4.5 mil Low Melt Batch Inclusive Bag.

| Test # 2 | Clear Film | 0.94 g Blue Film @2% Blue + 0.31 g Clear Film | 1.25 g Blue Film @2% Blue |
|---|---|---|---|
| Typical Formulation | | % | |
| Maleic Modified Glycerol Ester of Rosin | 15.30 | 15.30 | 15.30 |
| Plasticizer | 1.50 | 1.50 | 1.50 |
| Cold Flow and Viscosity Modifier | 2.50 | 2.50 | 2.50 |
| Flow Modifier (Elastomeric Polymer) | 1.00 | 1.00 | 1.00 |
| Bag Film | 0.25 | 0.25 | 0.25 |
| TiO2 (Rutile Grade 96% Pure) | 10.50 | 10.50 | 10.50 |
| Glass Beads (Type 1 70% Round) | 35.00 | 35.00 | 35.00 |
| Pellet Coating (Surface Treated) | 1.00 | 1.00 | 1.00 |
| CaCO3 Filler (STD 325 Mesh) | 33.03 | 33.03 | 33.03 |
| Binder (%) | 20.55 | 20.55 | 20.55 |
| Total (%) | 100.08 | 100.08 | 100.08 |
| Initial (400 F.) Viscosity | Initial (400 F.) Viscosity w/SC4-27 Spindle | | |
| 6 RPM | 8000 | 7333 | 8833 |
| 12 RPM | 5375 | 5083 | 5563 |
| 13 RPM | 3533 | 3408 | 3608 |
| 60 RPM | 2708 | 2667 | 2758 |
| Color Measurement | Color Measurement w/Byk Gardner 45/0 | | |
| Brightness - L* (C/2°) | 94.24 | 94.28 | 93.73 |
| Red/Green Color Scale - a* (C/2°) | −0.83 | −1.35 | −2.24 |
| Blue/Yellow Color Scale - b* (C/2°) | 4.67 | 3.50 | 3.40 |
| Brightness Y (C/2°) | 85.83 | 85.92 | 84.65 |
| Color Coordinate - x (C/2°) | 0.3175 | 0.3146 | 0.3133 |
| Color Coordinate - y (C/2°) | 0.3254 | 0.3236 | 0.3240 |
| YD 1925 Yellowness Index (C/2°) | 8.56 | 5.94 | 5.07 |
| Shore A Hardness (115 F.) | 53 | 57 | 56 |
| Ring and Ball Softening Point (F.) | 222 | 223 | 222 |
| Specific Gravity | 2.085 | 2.075 | 2.079 |

It should be understood that modifications to the embodiments disclosed herein can be made to meet a particular set of design criteria. For instance, the number of or configuration of containers 2, bulk materials 4, final product 8, additives 10, processes 6, bulk material formation processes 12, specifications 14, and/or other components or parameters may be used to meet a particular objective. For example, while exemplary implementations may show use of a first container 2a for a first process 6b and a second container 2b for a second process 6b, any number of containers 2 and processes 6 can be used. For example, an embodiment may include only a second container 2b for use with a second process 6b. As another example, there may be first, second, third, fourth, etc. processes 6. Any of the processes 6 can be the same as or different from any other process 6. Any process 6 can be configured to make a final product 8 that is the same as or different from another final product 8 made by another process 6. There may be a first, second, third, fourth etc. containers 2. Any of the containers 2 can be the same as or different from any other container 6. A container 6 may be configured for a single process 6 or multiple processes 6. Any container 6 can include any number of additives 10. Any of the additives 2 can be the same as or different from any other additive 6. Any number of bulk material processes 12 can be used. Any bulk material process 12 can be the same as or different from another bulk material process 12. Any number of bulk materials 4 can be used. Any bulk material 4 can be the same as or different from another bulk material 4. Any number of specifications 14 can be used. Any specification 14 can be the same as or different from another specification 14.

While exemplary embodiments disclose using the additive 10 for influencing a color index 14 of the final product 8, the additive 10 can be used for influencing any other specification 14 of the final product 8. For example, the additive 10 can be used to influence any other characteristic of the final product 8. For instance, the first specification 14a may be a first viscosity. The first additive 10a may be used by the first process 6a to generate a first final product 8a having the first viscosity. The second specification 14b may be a second viscosity. The second additive 10a may be used by the second process 6b to generate a second final product 8b having the second viscosity. Other specifications 14 of the final product 8 that may be influenced by the additives 10 can include, but are not limited to, a chemical composition, hardness, an electrical property, etc.

Therefore, while certain exemplary embodiments of apparatuses and methods of making and using the same have been discussed and illustrated herein, it is to be distinctly understood that the invention is not limited thereto but may be otherwise variously embodied and practiced within the scope of the following claims.

We claim:

1. A container for thermoplastic, bulk material comprising:
    a bag configured to contain thermoplastic bulk material, the bag comprising at least one color pigment;

wherein the bag and the thermoplastic bulk material are configured to be used as inputs in a process to generate a product; and wherein the at least one color pigment is configured to modify a color index of the product.

2. The container recited in claim 1, wherein the bag further comprises at least one additive in addition to the at least one color pigment.

3. A method of producing the container for thermoplastic bulk material recited in claim 1, comprising:

generating the container by fabricating a bag configured to contain thermoplastic bulk material, the bag being coated with at least one color pigment, impregnated with the at least one color pigment, and/or having the at least one color pigment applied thereto, wherein:

the container is configured to be consumed in a process that produces a product in which the bag, the at least one color pigment, and the thermoplastic bulk material are inputs to the process; and the at least one color pigment modifies a color index of the product.

4. The method recited in claim 3, wherein the fabricating the bag further comprises including at least one additive in addition to the at least one color pigment.

5. The container recited in claim 1, wherein the thermoplastic bulk material is a plurality of thermoplastic pellets.

6. The container recited in claim 5, wherein the bag further comprises at least one additive in addition to the at least one color pigment.

7. The method recited in claim 3 wherein the thermoplastic bulk material is a plurality of thermoplastic pellets.

8. The method recited in claim 7, wherein the fabricating the bag further comprises including at least one additive in addition to the at least one color pigment.

* * * * *